REMOTE CONTROL SYSTEM

Filed Oct. 7, 1944 3 Sheets-Sheet 1

Inventor:
Carroll R. Miner,
by Harry E. Dunham
His Attorney.

Inventor:
Carroll R. Miner,
by Harry E. Dunham
His Attorney.

Jan. 31, 1950 C. R. MINER 2,495,917

REMOTE CONTROL SYSTEM

Filed Oct. 7, 1944 3 Sheets-Sheet 3

Inventor:
Carroll R. Miner,
by Harry E. Dunham
His Attorney.

Patented Jan. 31, 1950 2,495,917

UNITED STATES PATENT OFFICE 2,495,917

REMOTE-CONTROL SYSTEM

Carroll R. Miner, Stratford, Conn., assignor to General Electric Company, a corporation of New York Application October 7, 1944, Serial No. 557,707

7 Claims. (Cl. 74—10.2)

My invention relates to remote control systems and particularly to such systems adapted for remote control of the tuning of a radio receiver from a remote point.

One of the objects of my invention is to provide an automatic tuning system by which a radio receiver may be tuned to any one of a plurality of predetermined frequencies from a remote point and in which one of said predetermined frequencies may readily be varied from said remote point.

Another object of my invention is to provide such a system in which the receiver may be manually tuned from said remote point through the mechanism by which said predetermined position is varied.

In a copending application, Serial No. 557,670, of Kirby Austin, filed October 7, 1944, and which is assigned to the assignee of my present application, is disclosed a remote control tuning system in which a mechanical mechanism is shown capable of rotating a tuning condenser, for example, to any one of a plurality of positions dependent upon which of a plurality of electromagnets is energized. Each electromagnet is associated with a gear group through which the condenser may be driven by a motor to a position predetermined in the gear group.

One of the objects of my present invention is to provide means whereby one of these positions may be readily adjusted from a remote point.

Another object of my invention is to provide means whereby the tuning device, or condenser, may be positively driven from said remote point as by operation of a hand crank at the remote point.

Figure 1:
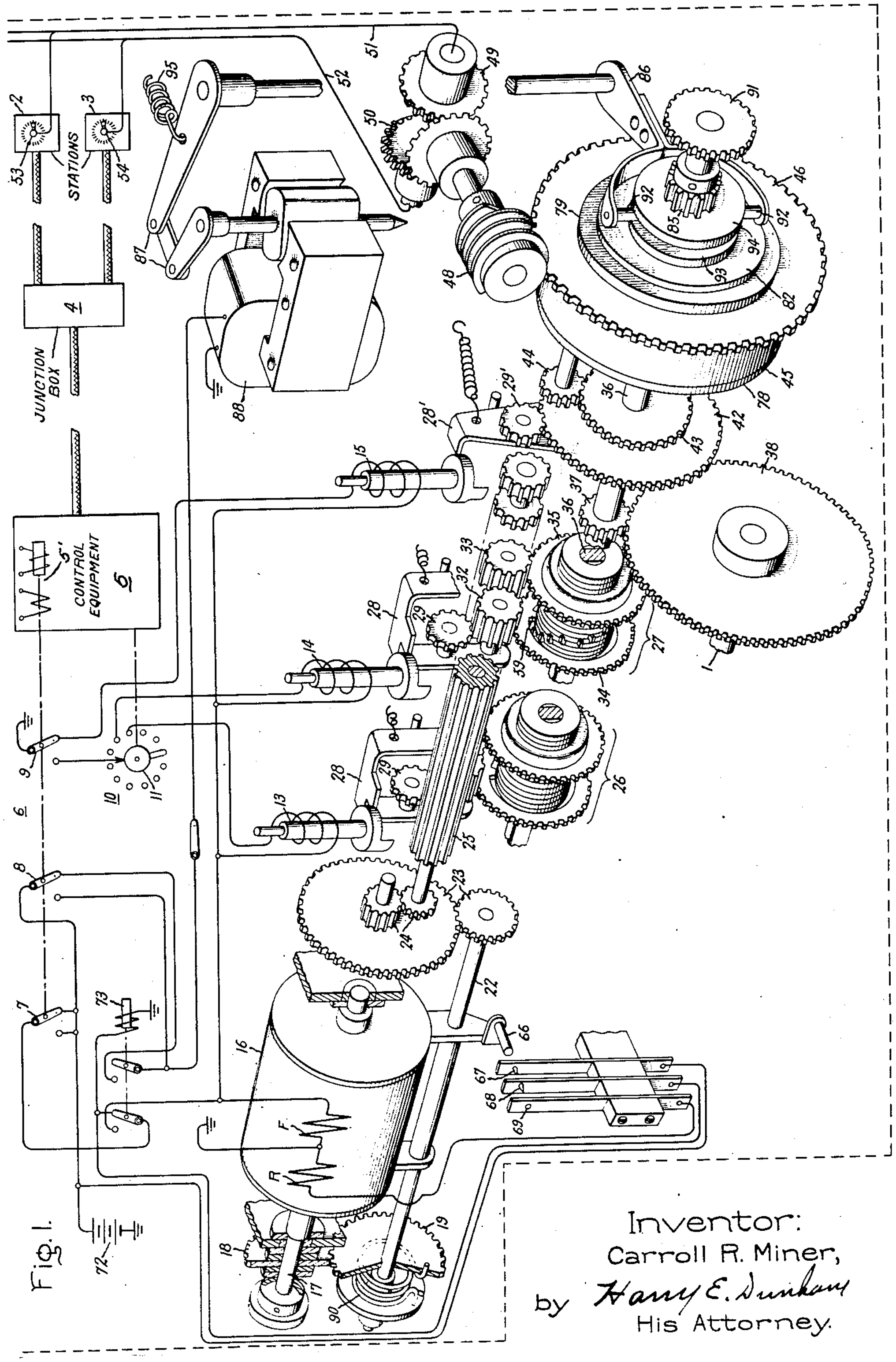
Figure 2:
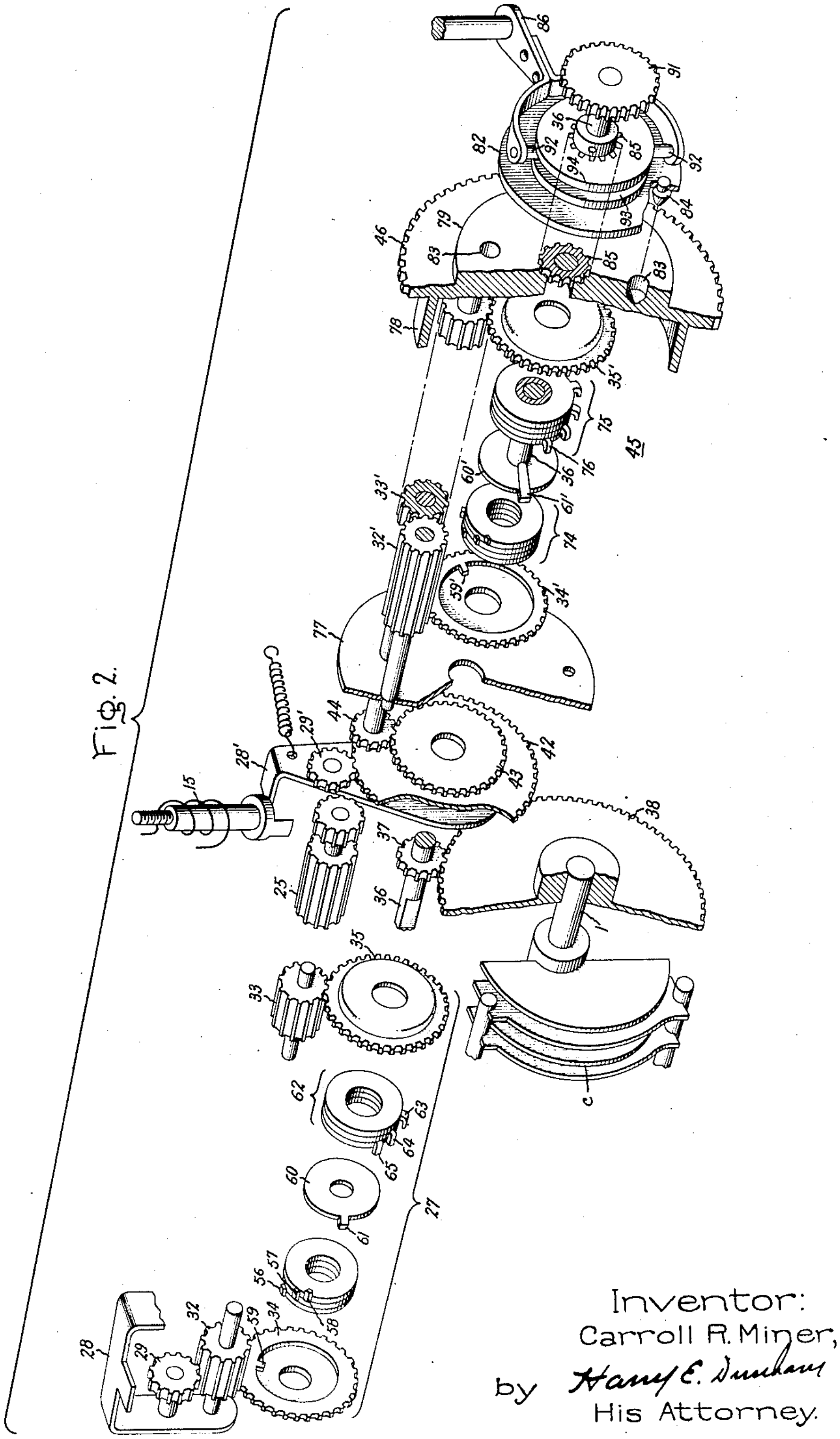
Figure 3:
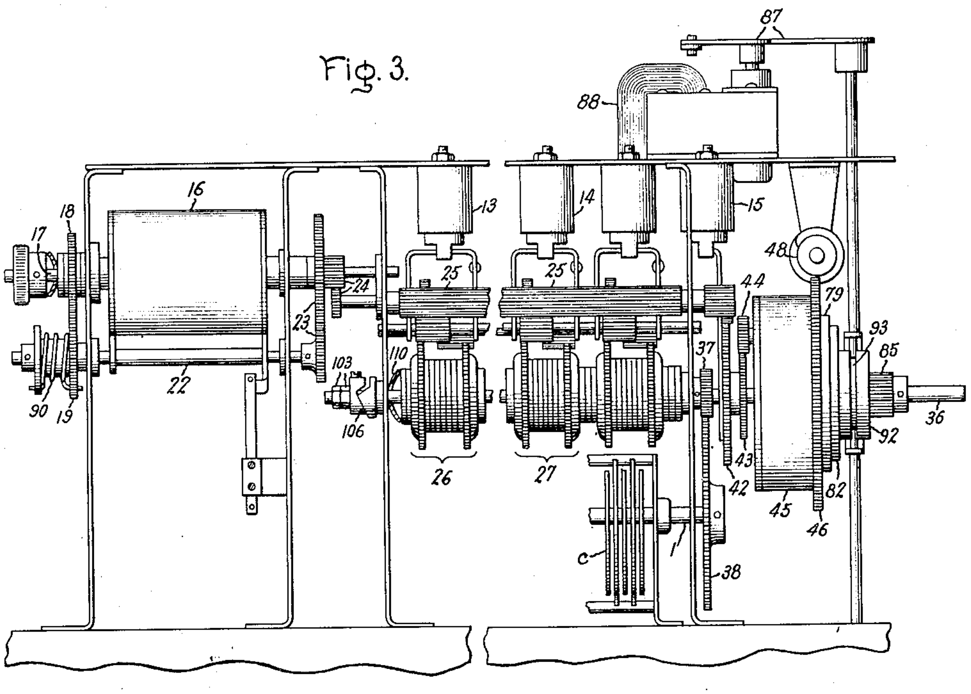
Figure 4:
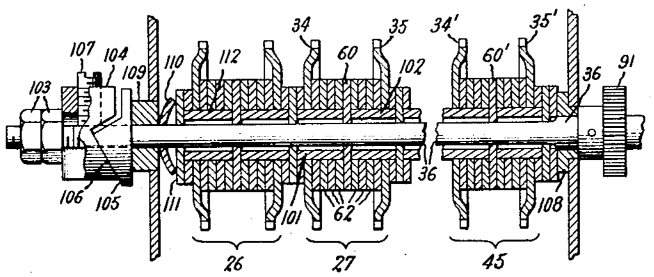

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 represents an embodiment of my invention; Fig. 2 is an exploded view of a portion of the mechanical apparatus of Fig. 1; Fig. 3 is an elevation view of the apparatus shown in Fig. 1; and Fig. 4 is a detail of the apparatus shown in Fig. 1.

Referring to Fig. 1 of the drawing, I have indicated in the lower portion thereof, at 1, a shaft which may be the shaft of the tuning condenser of a radio receiver, for example. It is desired to operate this shaft from one or more remote points to any one of a plurality of positions corresponding to frequencies to which the receiver is to be tuned. I have indicated two such remote points at 2 and 3 on the drawing. Suitable control apparatus is located at the stations 2 and 3 which may be selectively connected through a junction box 4 to control equipment 5 located in the receiver, the tuning of which is to be effected. This remote control apparatus may be of any desired type and need not be described here. One suitable apparatus for the purpose is shown in the above referred to application.

This control apparatus includes means such as the double acting solenoid 5' for positioning a switch 6, having three armatures 7, 8 and 9, either in its left-hand position when automatic tuning to predetermined stations is to be had, or in its right-hand position, as shown, when manual tuning of the receiver is to be had. It also includes apparatus to position a selector 10 in any one of a plurality of positions in accord with the predetermined station to be selected if automatic tuning is desired. This selector comprises a rotatable contact arm 11 arranged to be connected through armature 9 of the switch 6 to ground and which operates over a bank of contacts. These contacts are connected respectively to electromagnets 13, 14, etc. of the mechanical tuning mechanism shown in the lower portion of the drawing. One of these magnets corresponds to each predetermined frequency to which the receiver is to be tuned from remote points 2, or 3. Only two of these magnets are shown. There may, of course, be as many as desired. The mechanical tuning mechanism also includes a further magnet 15 which is operated when the switch 6 is in its right-hand position to adapt the tuning mechanism for manual tuning from the remote station.

The tuning mechanism comprises a motor 16 having a shaft 17 on which is frictionally mounted a gear 18 in mesh with a gear 19 on shaft 22. This shaft is connected through gears 23 and 24 to a long gear 25, which extends throughout the length of the tuning mechanism, and which is operated whenever the motor 16 is operated. Associated with this shaft 25 are a plurality of gear groups 26 and 27, each corresponding to a particular frequency to be selected and all of which are normally disengaged from the driving gear 25. The magnets 13 and 14 are each associated with one of these gear groups 26 and 27, each of these electromagnets being arranged when energized to attract an armature 28 which carries a gear 29 of its respective group which gear is continuously in mesh with the gear 32, which, in turn, is continuously in mesh with a gear 33. When the armature 28 is attracted, gear 29 is moved to a position where it engages the gear 25 and is operated thereby driving the two gears 32 and 33 in opposite directions. Gear 32 meshes with a gear 34 and gear 33 meshes with a gear 35. These gears are loosely mounted upon a shaft 36, which is geared to the tuning shaft 1 through gears 37 and 38. These gears are provided with means later to be described whereby when gear 29 is moved into mesh with the gear 25 the tuning shaft is operated through the respective gear group to a position where the gears jam, in which position the tuning shaft 1 stops, leaving the tuning device of the receiver, which may be a condenser having a rotatable element, in a position such that the receiver is tuned to the desired frequency.

The manual tuning magnet 15 has associated with it a similar armature 28' which when attracted also carries a gear 29' into mesh with the gear 25. This gear 29' is connected to drive the tuning shaft 36 through gears 42, 43, 44 and additional gears within the housing of a clutch mechanism 45. This mechanism 45 is such that the shaft 1 is operated to a position corresponding to the position in rotation of the gear 46 which is integral with the housing of the clutch mechanism and which may be rotated by means of a worm gear 48. This gear 48 is arranged to be operated through bevel gears 49 and 50 operated through mechanical connections 51 and 52 by hand cranks 53 and 54 in the different remote stations 2 and 3.

The mechanism for effecting these desired operations may best be understood by reference to Fig. 2 which shows an exploded view of a portion of mechanical tuning mechanism comprising the gear group 27 and the clutch mechanism 45.

At the left-hand portion of Fig. 2 are shown the gears 34 and 35 of the gear group 27, each of which is continuously in mesh with the respective gears 32 and 33, which, in turn, are in mesh with each other to rotate in opposite directions. The gear 32 meshes continuously with the gear 29 mounted on the armtaure 28, which may be actuated by the magnet to move the gear 29 into mesh with the long driving gear 25. The latter gear is shown in Fig. 2, broken away in order to show the gears 32 and 33, which lie directly in back of it. Gears 34 and 35 are loosely mounted upon the shaft 36 and have between them a disc 60 fixed, in a manner later to be described in connection with Fig. 4, to the shaft 36. Between the gear 34 and the disc 60 are a number of washers all loosely mounted upon the shaft and each having a projection 56, 57, 58 from its periphery. The washer having a projection 56 is positioned within the gear 34, which has an inward projection 59. Upon rotation of gear 34 the projection 59 engages the projection 56 of the first washer causing that washer to be rotated about the shaft. In its rotation the projection 56 engages the projection 57 of the next washer causing it to be rotated about the shaft and projection 57 finally engages the projection 58 causing the third washer to rotate about the shaft. The latter projection 58 finally engages the projection 61 on the disc 60, which is fixed to the shaft, whereupon the shaft is rotated to drive the tuning condenser. Gear 33, however, simultaneously rotates gear 35 in the opposite direction causing a similar pile-up of the group of washers 62 having projections 63, 64 and 65 which engage each other in succession until the projection 65 engages the opposite side of the projection 61 from the disc 60. When this happens the gears jam and the tuning shaft 1 stops. The motor 16 shown in Fig. 1 then stalls. This motor, however, is so mounted that when it stalls its stator rotates carrying a pin 66 into engagement with a group of three contacts 67, 68 and 69 causing all of these contacts to engage and to connect a source of potential 72, shown in the upper left-hand corner of Fig. 1 of the drawings, to the magnet of the relay 73 thereby energizing that relay. The relay operates and by its left-hand armature interrupts the energizing circuit of the motor. Thus the tuning operation is completed, leaving the tuning shaft 1 which carries the condenser C in a position corresponding to the frequency to be selected.

When the manual tuning magnet 15 is energized, it attracts its armature 28' carrying gear 29 into engagement with the gear 25. This latter gear, as previously described, is connected through gears 42, 43 and 44 with gears 32' and 33' within the clutch housing 45, these latter gears corresponding to the gears 32 and 33 of the group 27. The gear 32' is continuously in mesh with the gear 34' and the gear 33' is continuously in mesh with the gear 35'. Between these latter two gears is mounted the disc 60' which is fixed to the shaft and has a projection 61' from its periphery. Between this disc 60' and the gear 34' is a group of washers 74 each of which has a projection from its periphery overlaying the periphery of the washer at its right and the first of which projections is engaged by the projection 59' of the gear 34'. Thus in response to rotation of gear 34' the projection engages the projection from the periphery of the first washer of the group 74 causing that washer to rotate until its projection engages the corresponding projection of the next washer and so on until all of the washers rotate together until the last projection engages the projection 61' thereby rotating the shaft 36. At the same time gear 35' rotates in the opposite direction causing a similar pile-up of the washers in the group 75 until the projection 76 from the periphery of the last washer of that group engages the opposite side of the projection 61' of the disc 60' whereupon the gears jam leaving the tuning condenser C in a predetermined position. The motor, of course, stalls as previously described and is deenergized by operation of the relay 73.

The position at which the shaft 1 stops is dependent upon the position in rotation of the gear 46, which is integral with the housing about the gear mechanism 32', 33', 34', 35'. This housing comprises the gear 46 and the end plate 77 which are spaced apart along the shaft 36 and having between them the mechanism including the gears and washers just described enclosed by the cylindrical projection 78 from the gear 46. Gears 32' and 33' are journaled in between the end plate 77 and the gear 46 so that they may be rotated bodily about the shaft 36 as the gear 46 is rotated. During this rotation the gear 44 is carried about the periphery of the gear 43. Of course, the position of the shaft 36 at which the gears jam, as previously described, is dependent upon the position in rotation about the shaft 36 of these gears 32' and 33' and hence is dependent upon the position in rotation of the gear 46, which is varied by the worm gear 48 of Fig. 1.

Gear 46 is arranged to be rigidly connected to the shaft 36 to drive that shaft and the condenser C for manual tuning of the receiver. This connection is provided by means of two clutch plates 79 and 82, the first of which is integral with the gear 46 and has two holes 83 therein and the other of which is arranged to cooperate therewith and carries two pins 84 only one of which is shown in the drawing. This latter clutch plate 82 is splined to the sleeve 85, which is fixed to the shaft. The plate 82, however, may be moved longitudinally of the sleeve 85 and of shaft 36 by means of a clutch actuating member 86 which, as shown in Fig. 1, is operated through a mechanical linkage 87 by an electromagnet 88. The clutch operating member 86 is bifurcated at its left-hand end and carries two inwardly projecting pins 92, which ride in a groove 93 about the circumference of a cylindrical portion 94 of the clutch plate 82 so that the clutch plate may be operated to the right to disengage the pins 84 from the holes 83 thereby to permit rotation of the shaft 36, the pins 92 sliding in the groove 93. When clutch operating member 86 is operated to the left the pins 84 engage the holes 83 locking gear 46 to the shaft so that the condenser may then be driven directly by rotation of the gear 46 through the worm gear 48 shown in Fig. 1.

As shown in Fig. 1, the switch 6 is in the position corresponding to manual tuning of the receiver. Relay 73 is energized and by its left-hand armature maintains a holding circuit for itself through said left-hand armature and the switch 7 in its right-hand position and source of potential 72. Clutch magnet 88 is deenergized so that clutch plates 79 and 82 are in engagement and the pins 84, shown in Fig. 2, are within the holes 83 of the plate 79. Thus rotation of the worm gear 48 causes rotation of the gear 46 and shaft 36, which in turn rotates the shaft 1 of the tuning element. The worm gear 48 may be rotated through the mechanical connections 51 and 52 extending to the two remote stations 3 and 2.

Let us suppose that the operator now desires to tune the receiver to a predetermined frequency. Through his remote control equipment he operates the switch 6 to the left and the selector 10 to the position corresponding to the frequency to be selected. Movement of switch 7 to the left momentarily breaks the holding circuit of relay 73 causing that relay to be deenergized. Relay 73 drops out and completes the circuit for the forward winding F of the motor through the left-hand armature of relay 73 in its left-hand position, switch 7 in its left-hand position and the source 72. If it be assumed that the selector 10 has been operated by the operator to a position corresponding to magnet 14, that magnet is energized. The circuit of this magnet extends from source 72 through armature 7 of switch 6, left armature of relay 73 in its left position, winding of electromagnet 14, and selector 10 in position corresponding to magnet 14 to ground. Magnet 14 actuates its armature 28 carrying gear 29 into engagement with gear 25 which is now driven by the motor. Thus the motor drives shaft 1 carrying the tuning element until the gears in the group 27 jam, as previously described, whereupon the motor stalls. Its stator then rotates in a clockwise direction against spring 90 carrying pin 66 into engagement with the contact 67 completing a circuit from the source 72 through contacts 67 and 68 to relay 73. This relay thus operates and breaks the circuit of the forward winding F of the motor and of electromagnet 14 and again completes a holding circuit for itself through its left-hand armature in right-hand position.

During this operation, switch 8 in its left-hand position energizes the clutch magnet 88 which operates through linkage 87 to disengage the two clutch plates 79 and 82 thereby permitting the shaft 36 to rotate freely.

If the operator at one of the stations 2 or 3 desires now to tune the receiver to a frequency corresponding to the position of its respective handcrank 53, or 54, as the case may be, by means of his remote control system he operates switch 6 to the right. Armature 7 of switch 6 interrupts the holding circuit for relay 73 momentarily and this relay drops out and by its left-hand armature closes the circuit for the forward winding of the motor. Armature 9 of the switch 6 completes a circuit for the magnet 15 which extends from ground through armature 9 and its cooperating contact, winding of magnet 15, left-hand armature of relay 73 in its left-hand position, armature 7 in its right-hand position and source 72. Magnet 15 is thus energized during operation of the motor and the motor operates to drive the chain of gears 25, 29′, 42, 43, 44, as shown in Fig. 1, and the gear group 32′, 33′, 34′ and 35′ of the clutch mechanism 45 to a position where these gears jam, as previously described, this position being dependent upon the position of the gear 46. The position of this gear of course corresponds to the position of the handcranks. When this occurs the motor stalls, the stator rotates clockwise and by means of pin 66 causes contacts 67 and 68 to engage thereby again energizing relay 73, which operates to break the circuit of the motor. It will be apparent that the gear 46 is normally stationary, although the rotative position thereof is adjustable by the handcranks. In manual tuning, the gear may be mechanically driven by either handcrank, or, if it is desired to adjust the frequency to which the receiver will be tuned by operating magnet 15, gear 46 is adjusted by the handcranks to the desired position.

Relay 73 also by its right-hand armature interrupts the circuit of the clutch magnet 88 whereupon spring 95 operates the clutch operating member 86 to the left causing the clutch plates 79 and 82 to engage and the pins 84, as shown in Fig. 2, to enter the holes 83. Thereafter, the tuning shaft 1 may be rotated by rotation of the worm gear 48, which rotates the gear 46 causing rotation of the clutch plate 82, which is splined to the shaft 36 which is geared to the shaft 1. Thus the clutch mechanism 45 operates both to provide an additional preset position which is readily variable from the remote stations and also it provides a direct drive for the condenser shaft whereby it may be operated by the handcranks 53 and 54 in the stations 2 and 3.

If desired, the handcranks 53 and 54 may be provided with a scale calibrated in terms of frequency to which the receiver is tuned. The shaft 36 is also provided with a gear 91 by which any suitable frequency indicating mechanism in the receiver itself may be driven thereby continuously to indicate the frequency to which the receiver is tuned.

Sometimes in the operation of the system through the remote control mechanism described in the above referred to patent application one of the magnets 13 or 14 becomes energized before the gear of a different magnet is disengaged from gear 25. These gears 29 may not drop out from engagement with gear 25 immediately upon deenergization of the respective magnet since the direction of rotation of the gear 25 may be such as to maintain the gear 29 in engagement with the gear 25. Then if the second magnet becomes energized, two gears 29 may simultaneously be in engagement with the gear 25 with the result that jamming of the gears may occur while the shaft 1 is at an undesired position, that is, a position not corresponding to any predetermined frequency. Some backward rotation of the gear 25 is necessary to the reliable disengagement of the gears 29. To provide this backward rotation in a positive and effective manner the reverse winding R is provided on the motor connected in circuit between ground and the contact 69 to which positive voltage from the battery 72 is supplied whenever motor 16 stalls and the pin 66 operates the contacts 67, 68 and 69 into engagement. This reverse winding causes a positive momentary backward rotation of the gear 25 thereby positively throwing the gears 29 out of engagement therewith. Of course the circuit of winding R is broken when pin 66 releases the contacts 67, 68 and 69.

Fig. 3 shows an elevation view of the mechanical mechanism of Fig. 1. The same reference numerals which appear on Fig. 1 are applied to corresponding elements of Fig. 3 and it is believed that no further description thereof is required.

Fig. 4 shows the means by which the discs 60 may be clamped to the shaft 36 in adjustable predetermined positions to determine the frequency to be selected by the respective gear group. These discs 60 are each positioned between two sleeves 101 and 102 upon which the different washers are mounted between these discs 60 and the respective gears 34 and 35. The shaft 36 is screwthreaded at its left end and provided with nuts 103 and two clamping members 104, 105. These clamping members have oblique cooperating surfaces as indicated at 106, the member 104 being provided with a bore larger than the diameter of the shaft and with a set screw 107 which engages the shaft. When this set screw is rotated to bear against the shaft, the clamping member 104 is pushed upward, causing the oblique surface 106 of members 104 and 105 to engage and slide upon each other thereby pressing bearing member 109 and spring washer 110 against the disc 111 which abuts against the end of the left-hand sleeve 112. The right end of the shaft is anchored in the bearing 108. In this way endwise pressure is brought onto all of the sleeves thereby clamping the washers 62 between adjacent sleeves and against rotation.

To change the frequency to which the receiver is to be tuned by any gear group 26 and 27, it is necessary only to release the set screw 107, rotate the respective washer 60 to the desired position and reset the set screw 107.

While I have shown and described a particular embodiment of my invention, it will of course be understood that I do not wish to be limited thereto, since different modifications both in the circuit arrangement and in the structure employed may be made without departing from the spirit and scope of my invention. I contemplate by the appended claims, therefore, to cover any such modifications as fall within the true spirit and scope of my invention.

What I claim as new and desire to secure by Letters Patent of the United States, is:

1. The combination, in an automatic tuning system, of a motor, a rotatable tuning element, a plurality of electromagnets, a mechanical interconnection between said motor and tuning element to operate said element to any one of a plurality of preset positions selectively in accord with the electromagnet operated, said electromagnets being operatively associated with said interconnection, means to operate said electromagnets from a remote point, and means to vary from said remote point the position to which said element is operated when a predetermined one of said electromagnets is operated.

2. The combination, in an automatic tuning system, of a motor, a rotatable tuning element, a plurality of electromagnets, and a mechanical interconnection mechanically associated with the armatures of said electromagnets between said motor and tuning element to operate said element to any one of a plurality of preset positions selectively in accord with the electromagnet operated, means to operate said electromagnets from a remote point and to energize said motor to drive said tuning element through said mechanical interconnection to a position corresponding to the electromagnet operated, and means adjustable at said remote point to vary the position to which said element is operated by said motor when a predetermined one of said electromagnets is operated.

3. The combination, in an automatic tuning system, of a motor, a tuning element and a plurality of driving connections between said motor and said tuning element, each of said driving connections having associated therewith an electromagnet, each of said driving connections including a gear group normally disengaged from said motor, means controlled by each electromagnet to engage the respective gear group with said motor, each gear group including means to drive the respective tuning element to a corresponding preset position, and one of said gear groups having an element manually rotatable to vary the position to which said tuning element is driven, and a clutch connection between said manually rotatable element and said tuning element through which said tuning element is driven for manual tuning when the respective gear group is disengaged from said motor.

4. In combination, a shaft to be positioned in any one of a plurality of positions, a motor, a plurality of mechanical drive connections between said motor and shaft, each of said connections being normally interrupted and adapted when completed to drive said shaft to a corresponding position and then jam leaving said shaft in said corresponding position, a normally stationary gear supporting a portion of one of said connections in adjustable position, means to jam said connection when said shaft is in a position corresponding to the position of the respective adjustable gear, means controlled from a remote point to complete any desired one of said connections thereby to operate said shaft to corresponding positions, and means adjustable at said remote point to rotate said gear, whereby said shaft may be operated through said one connection to any desired position.

5. In combination, a shaft to be positioned in any one of a plurality of positions, a motor, a plurality of mechanical drive connections between said motor and shaft, each of said connections being normally interrupted and adapted when completed to drive said shaft to a corresponding position and then jam leaving said shaft in said corresponding position, one of said connections being adjustable by a normally stationary member adjustable to different positions in rotation about said shaft, means to jam said connection when said shaft is in a position corresponding to the position of the adjustable member, means controlled from a remote point to complete any desired one of said connections, thereby to operate said shaft to corresponding positions, means at said remote point to rotate said member, whereby said shaft may be operated through said one connection to any desired position, a clutch connection between said member and said shaft, and means to break said clutch connection when said one mechanical connection is completed and to make said clutch connection when said one mechanical connection is interrupted.

6. In combination, a shaft to be positioned in any one of a plurality of predetermined positions, a motor, a plurality of drive connections between said motor and shaft, each of said connections being normally interrupted and adapted when completed to drive said shaft to a corresponding position, means selectively to complete any of said drive connections, one of said connections being adjustable by remotely controlled positioning means, a clutch connecting said means and said shaft, whereby said shaft is directly coupled for driving by said means when said clutch is engaged, and means for disengaging said clutch, whereby said shaft is driven to a position corresponding to the adjusted position of said one connection upon completion of said one connection.

7. The combination in an automatic control system of a rotatable element to be controlled, a source of rotational energy, rotational energy transfer means for connecting said source to said element comprising a plurality of channels, means for presetting each of said channels, an additional channel, manual means for selecting from a remote control station one of said channels for energy transfer, means for varying from said remote control station the setting of said additional channel, separate means responsive to the rotational position of said element and respectively associated with each of said channels adapted to jam the selected channel against further energy transfer when said element reaches a position related to the setting of the selected channel.

CARROLL R. MINER.

REFERENCES CITED

The following references are of record in the file of this patent:

UNITED STATES PATENTS

| Number | Name | Date |
|---|---|---|
| 2,025,218 | Reinken | Dec. 24, 1935 |
| 2,055,363 | Powell | Sept. 22, 1936 |
| 2,078,060 | Clement | Apr. 20, 1937 |
| 2,248,350 | Hill | July 8, 1941 |
| 2,411,617 | Elliott | Nov. 26, 1946 |
| 2,417,528 | Ten Cate et al. | Mar. 18, 1947 |